(12) United States Patent
Meng et al.

(10) Patent No.: US 11,899,179 B2
(45) Date of Patent: Feb. 13, 2024

(54) OPTICAL IMAGING LENS ASSEMBLY

(71) Applicant: ZHEJIANG SUNNY OPTICS CO., LTD., Zhejiang (CN)

(72) Inventors: Xiangyue Meng, Zhejiang (CN); Litong Song, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

(*) Notice: Subject to any disclaimer, the term of this patent is extended or adjusted under 35 U.S.C. 154(b) by 244 days.

(21) Appl. No.: 17/383,460

(22) Filed: Jul. 23, 2021

(65) Prior Publication Data

US 2022/0026683 A1 Jan. 27, 2022

(30) Foreign Application Priority Data

Jul. 23, 2020 (CN) .......................... 202010716845.6

(51) Int. Cl.
*G02B 13/06* (2006.01)
*G02B 13/18* (2006.01)
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ...... G02B 13/0045; G02B 9/62; G02B 13/18; G02B 27/0012; G02B 13/06
See application file for complete search history.

(56) References Cited

U.S. PATENT DOCUMENTS

| 2018/0106987 A1* | 4/2018 | Lin ..................... G02B 27/0025 |
| 2022/0146790 A1* | 5/2022 | Zou ........................ G02B 13/18 |
| 2022/0236536 A1* | 7/2022 | Dang ................. G02B 13/0045 |

FOREIGN PATENT DOCUMENTS

TW  201405162 A  *  2/2014  ......... G02B 13/0045

* cited by examiner

*Primary Examiner* — Pinping Sun
*Assistant Examiner* — Mackenzi Waddell
(74) *Attorney, Agent, or Firm* — Gang Yu

(57) ABSTRACT

The disclosure provides an optical imaging lens assembly, which sequentially includes from an object side to an image side along an optical axis: a first lens, a second lens, a third lens, a fourth lens, a fifth lens, and a sixth lens with a refractive power respectively; a center thickness CT3 of the third lens on the optical axis and a center thickness CT4 of the fourth lens on the optical axis satisfy $1.0 \leq CT4/CT3 < 1.5$; and a spacing distance T34 between the third lens and the fourth lens on the optical axis and a spacing distance T45 between the fourth lens and the fifth lens on the optical axis satisfy $4.0 < T34/T45 < 15.5$.

18 Claims, 13 Drawing Sheets longitudinal aberration curve lateral color curve (micron)

longitudinal aberration curve (millimeter)

longitudinal aberration curve astigmatism curve longitudinal aberration curve

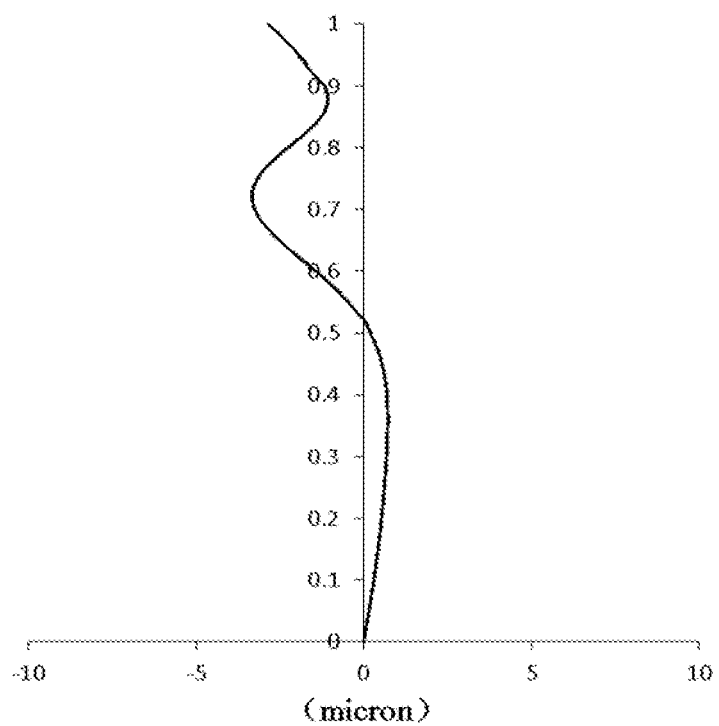

OPTICAL IMAGING LENS ASSEMBLY

CROSS-REFERENCE TO RELATED PRESENT INVENTION(S)

The disclosure claims priority to and the benefit of Chinese Patent Present invention No. 202010716845.6, filed in the China National Intellectual Property Administration (CNIPA) on 23 Jul. 2020, which is incorporated herein by reference in its entirety.

TECHNICAL FIELD

The disclosure relates to the field of optical elements, and particularly to an optical imaging lens assembly.

BACKGROUND

In recent years, with the rapid development of electronic products, the demand of users in portable handheld electronic devices has increased day by day, and higher requirements have been made to optical imaging lens assemblies applied to handheld electronic devices.

An optical imaging lens assembly is required not only to have high imaging quality but also to have the characteristic of wide field of view. In addition, an area of an image surface affects an imaging effect of an optical imaging lens assembly relatively greatly, namely the optical imaging lens assembly may receive more energy and information if the image surface is larger. Therefore, an optical imaging lens assembly with the characteristics of wide angle, large image surface, high imaging quality, etc., is consistent with a development trend in the field of cameras at present.

SUMMARY

Some embodiments of the disclosure provide an optical imaging lens assembly, which sequentially includes from an object side to an image side along an optical axis: a first lens, a second lens, a third lens, a fourth lens, a fifth lens, and a sixth lens with refractive power respectively, wherein a center thickness CT3 of the third lens on the optical axis and a center thickness CT4 of the fourth lens on the optical axis may satisfy 1.0≤CT4/CT3<1.5; and a spacing distance T34 between the third lens and the fourth lens on the optical axis and a spacing distance T45 between the fourth lens and the fifth lens on the optical axis may satisfy 4.0<T34/T45<15.5.

In an implementation mode, an object-side surface of the first lens to an image-side surface of the sixth lens includes at least one aspheric mirror surface.

In an implementation mode, Semi-FOV is a half of a maximum field of view of the optical imaging lens assembly, and Semi-FOV may satisfy Semi-FOV≥0.65°.

In an implementation mode, a curvature radius R9 of an object-side surface of the fifth lens and an abbe number V5 of the fifth lens may satisfy $-5.0 \text{ mm}^{-1} < V5/R9 < -2.5 \text{ mm}^{-1}$.

In an implementation mode, an effective focal length f4 of the fourth lens and an effective focal length f5 of the fifth lens may satisfy 0.5<|f5|/f4<1.5.

In an implementation mode, ImgH is a half of a diagonal length of an effective pixel region on an imaging surface of the optical imaging lens assembly, ImgH and a total effective focal length f of the optical imaging lens assembly may satisfy 1.0<ImgH/f<3.0.

In an implementation mode, a center thickness CT6 of the sixth lens on the optical axis and a spacing distance T56 between the fifth lens and the sixth lens on the optical axis may satisfy 1.0<CT6/T56<3.5.

In an implementation mode, the center thickness CT3 of the third lens on the optical axis and a spacing distance T23 between the second lens and the third lens on the optical axis may satisfy 0<CT3/T23<2.5.

In an implementation mode, a curvature radius R2 of an image-side surface of the first lens and a curvature radius R3 of an object-side surface of the second lens may satisfy 1.0<R3/R2<2.0.

In an implementation mode, the effective focal length f5 of the fifth lens and the total effective focal length f of the optical imaging lens assembly may satisfy -2.5<f5/f≤-1.5.

In an implementation mode, an effective focal length f1 of the first lens and an effective focal length f3 of the third lens may satisfy -1.5<f3/f1<-1.0.

In an implementation mode, the curvature radius R3 of the object-side surface of the second lens and a spacing distance T12 between the first lens and the second lens on the optical axis may satisfy 1.0<R3/T12<3.0.

In an implementation mode, a curvature radius R4 of an image-side surface of the second lens and a curvature radius R5 of an object-side surface of the third lens may satisfy -4.5<(R4+R5)/(R4-R5)<-2.5.

In an implementation mode, a curvature radius R8 of an image-side surface of the fourth lens and a refractive index N4 of the fourth lens may satisfy $-4.0 \text{ mm} < R8/N4 < -2.0 \text{ mm}$.

Some other embodiments of the disclosure also provide an optical imaging lens assembly, which sequentially includes from an object side to an image side along an optical axis: a first lens, a second lens, a third lens, a fourth lens, a fifth lens, and a sixth lens with refractive power respectively, wherein a curvature radius R9 of an object-side surface of the fifth lens and an abbe number V5 of the fifth lens may satisfy $-5.0 \text{ mm}^{-1} < V5/R9 < -2.5 \text{ mm}^{-1}$; and a spacing distance T34 between the third lens and the fourth lens on the optical axis and a spacing distance T45 between the fourth lens and the fifth lens on the optical axis may satisfy 4.0<T34/T45<15.5.

In an implementation mode, a center thickness CT6 of the sixth lens on the optical axis and a spacing distance T56 between the fifth lens and the sixth lens on the optical axis may satisfy 1.0<CT6/T56<3.5.

In an implementation mode, a center thickness CT3 of the third lens on the optical axis and a spacing distance T23 between the second lens and the third lens on the optical axis may satisfy 0<CT3/T23<2.5.

In an implementation mode, a curvature radius R2 of an image-side surface of the first lens and a curvature radius R3 of an object-side surface of the second lens may satisfy 1.0<R3/R2<2.0.

In an implementation mode, an effective focal length f5 of the fifth lens and a total effective focal length f of the optical imaging lens assembly may satisfy -2.5<f5/f≤-1.5.

In an implementation mode, an effective focal length f1 of the first lens and an effective focal length f3 of the third lens may satisfy -1.5<f3/f1<-1.0.

In an implementation mode, ImgH is a half of a diagonal length of an effective pixel region on an imaging surface of the optical imaging lens assembly, ImgH and the total effective focal length f of the optical imaging lens assembly may satisfy 1.0<ImgH/f<3.0.

In an implementation mode, the curvature radius R3 of the object-side surface of the second lens and a spacing distance T12 between the first lens and the second lens on the optical axis may satisfy 1.0<R3/T12<3.0.

In an implementation mode, a curvature radius R4 of an image-side surface of the second lens and a curvature radius R5 of an object-side surface of the third lens may satisfy $-4.5<(R4+R5)/(R4-R5)<-2.5$.

In an implementation mode, a curvature radius R8 of an image-side surface of the fourth lens and a refractive index N4 of the fourth lens may satisfy $-4.0 \text{ mm}<R8/N4<-2.0 \text{ mm}$.

In an implementation mode, an effective focal length f4 of the fourth lens and the effective focal length f5 of the fifth lens may satisfy $0.5<|f5|/f4<1.5$.

In an implementation mode, the center thickness CT3 of the third lens on the optical axis and a center thickness CT4 of the fourth lens on the optical axis may satisfy $1.0 \leq CT4/CT3<1.5$.

In an implementation mode, Semi-FOV is a half of a maximum field of view of the optical imaging lens assembly, and Semi-FOV may satisfy Semi-FOV$\geq 65°$.

According to the disclosure, the refractive power is configured reasonably, and optical parameters are optimized, so that the provided optical imaging lens assembly is applicable to a portable electronic product, and has at least one of beneficial effects of small size, wide angle, large image surface, high imaging quality, etc.

BRIEF DESCRIPTION OF THE DRAWINGS

Detailed descriptions made to unrestrictive embodiments with reference to the following drawings are read to make the other characteristics, purposes and advantages of the disclosure more apparent.

FIGS. 10A-10D show a longitudinal aberration curve, an astigmatism curve, a distortion curve, and a lateral color curve of an optical imaging lens assembly according to Embodiment 5 respectively.

DETAILED DESCRIPTION OF THE EMBODIMENTS

Figure 1:
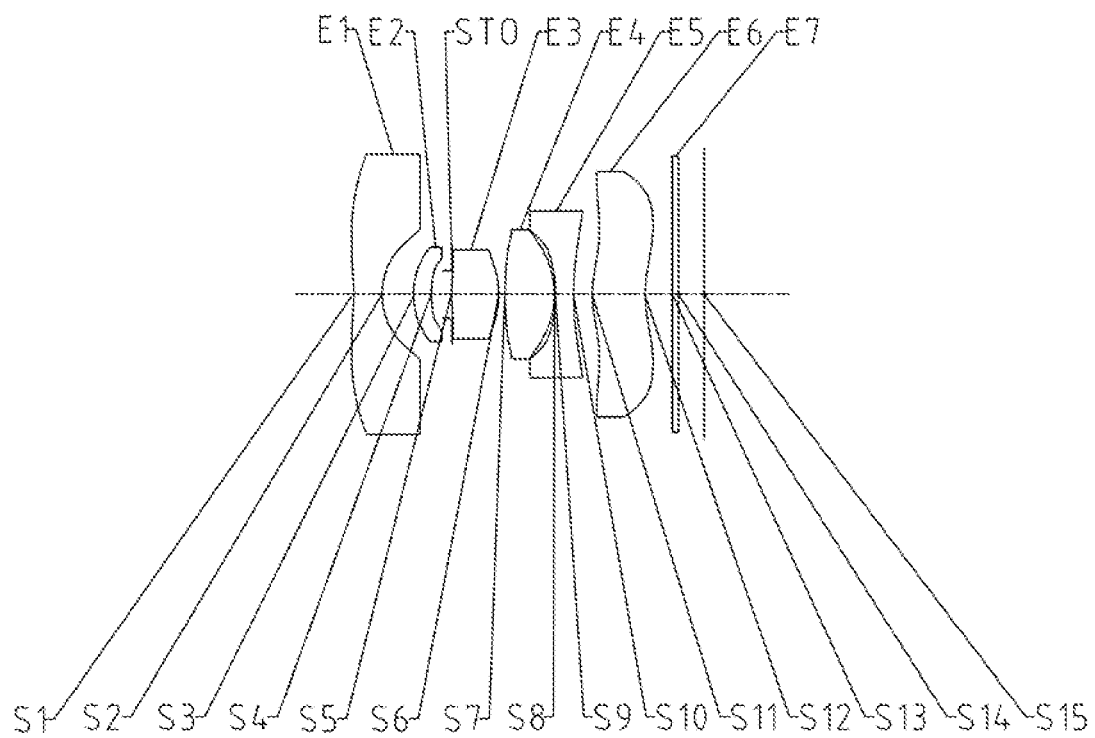
FIG. 1 shows a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc., are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

An optical imaging lens assembly according to the exemplary embodiment of the disclosure may include six lenses with refractive power, i.e., a first lens, a second lens, a third lens, a fourth lens, a fifth lens, and a sixth lens respectively. The six lenses are sequentially arranged from an object side to an image side along an optical axis. In the first lens to the sixth lens, there may be a spacing distance between any two adjacent lenses.

In the exemplary embodiment, all of the first lens, the second lens, the third lens, the fourth lens, the fifth lens and the sixth lens may have a positive refractive power or a negative refractive power.

In the exemplary embodiment, the optical imaging lens assembly according to the disclosure may satisfy $4.0<T34/T45<15.5$, wherein T34 is a spacing distance between the third lens and the fourth lens on the optical axis, and T45 is a spacing distance between the fourth lens and the fifth lens on the optical axis. More specifically, T34 and T45 may further satisfy $4.2<T34/T45<15.5$.

In the exemplary embodiment, the optical imaging lens assembly according to the disclosure may satisfy Semi-FOV≥65°, wherein Semi-FOV is a half of a maximum field of view of the optical imaging lens assembly. More specifically, Semi-FOV may further satisfy Semi-FOV≥69°. Satisfying Semi-FOV≥65° is favorable for correcting each aberration of the optical imaging lens assembly and satisfying a high-definition imaging requirement of a wide-angle lens.

In the exemplary embodiment, the optical imaging lens assembly according to the disclosure may satisfy $0.5<|f5|/f4<1.5$, wherein f4 is an effective focal length of the fourth lens, and f5 is an effective focal length of the fifth lens. More specifically, f5 and f4 may further satisfy $0.8<|f5|/f4<1.5$. Satisfying $0.5<|f5|/f4<1.5$ is favorable for reasonably configuring the effective focal lengths of the fourth lens and the fifth lens and correcting a monochromatic aberration of the optical imaging lens assembly.

In the exemplary embodiment, the optical imaging lens assembly according to the disclosure may satisfy $1.0<ImgH/f<3.0$, wherein ImgH is a half of a diagonal length of an effective pixel region on an imaging surface of the optical imaging lens assembly, and f is a total effective focal length of the optical imaging lens assembly. More specifically, ImgH and f may further satisfy $1.3<ImgH/f<2.8$. Satisfying $1.0<ImgH/f<3.0$ is favorable for achieving the characteristic of relatively small total length of the optical imaging lens assembly.

In the exemplary embodiment, the optical imaging lens assembly according to the disclosure may satisfy $1.0<CT6/T56<3.5$, wherein CT6 is a center thickness of the sixth lens on the optical axis, and T56 is a spacing distance between the fifth lens and the sixth lens on the optical axis. More specifically, CT6 and T56 may further satisfy $1.2<CT6/T56<3.3$. Satisfying $1.0<CT6/T56<3.5$ may make the optical imaging lens assembly relatively small in total track length and compact in structure, and meanwhile, is favorable for correcting a axial chromatic aberration of the optical imaging lens assembly.

In the exemplary embodiment, the optical imaging lens assembly according to the disclosure may satisfy $0<CT3/T23<2.5$, wherein CT3 is a center thickness of the third lens on the optical axis, and T23 is a spacing distance between the second lens and the third lens on the optical axis. More specifically, CT3 and T23 may further satisfy $0.3<CT3/T23<2.4$. Satisfying $0<CT3/T23<2.5$ may make the optical imaging lens assembly relatively small in total track length and compact in structure, and meanwhile, is favorable for correcting the monochromatic aberration of the optical imaging lens assembly.

In the exemplary embodiment, the optical imaging lens assembly according to the disclosure may satisfy $1.0<R3/R2<2.0$, wherein R2 is a curvature radius of an image-side surface of the first lens, and R3 is a curvature radius of an object-side surface of the second lens. More specifically, R3 and R2 may further satisfy $1.0<R3/R2<1.7$. Satisfying $1.0<R3/R2<2.0$ is favorable for correcting a lateral color of the optical imaging lens assembly.

In the exemplary embodiment, the optical imaging lens assembly according to the disclosure may satisfy $-2.5<f5/f≤-1.5$, wherein f5 is the effective focal length of the fifth lens, and f is the total effective focal length of the optical imaging lens assembly. Satisfying $-2.5<f5/f≤-1.5$ is favorable for correcting the axial chromatic aberration of the system.

In the exemplary embodiment, the optical imaging lens assembly according to the disclosure may satisfy $-1.5<f3/f1<-1.0$, wherein f1 is an effective focal length of the first lens, and f3 is an effective focal length of the third lens. Satisfying $-1.5<f3/f1<-1.0$ is favorable for correcting the lateral color of the optical imaging lens assembly.

In the exemplary embodiment, the optical imaging lens assembly according to the disclosure may satisfy $1.0≤CT4/CT3<1.5$, wherein CT3 is the center thickness of the third lens on the optical axis, and CT4 is a center thickness of the fourth lens on the optical axis. More specifically, CT4 and CT3 may further satisfy $1.0≤CT4/CT3<1.4$. Satisfying $1.0≤CT4/CT3<1.5$ is favorable for correcting a field curvature in an off-axis field of view, and meanwhile, may satisfy a machining and production requirement.

In the exemplary embodiment, the optical imaging lens assembly according to the disclosure may satisfy $1.0<R3/T12<3.0$, wherein R3 is the curvature radius of the object-side surface of the second lens, and T12 is a spacing distance between the first lens and the second lens on the optical axis. More specifically, R3 and T12 may further satisfy $1.0<R3/T12<2.9$. Satisfying $1.0<R3/T12<3.0$ is favorable for reasonably configuring the curvature radius of the object-side surface of the second lens and favorable for correcting each aberration and reducing the influence of a ghost image.

In the exemplary embodiment, the optical imaging lens assembly according to the disclosure may satisfy $-4.5<(R4+R5)/(R4-R5)<-2.5$, wherein R4 is a curvature radius of an image-side surface of the second lens, and R5 is a curvature radius of an object-side surface of the third lens. Satisfying $-4.5<(R4+R5)/(R4-R5)<-2.5$ is favorable for reasonably planning shapes of the second lens and the third lens and correcting the field curvature in the off-axis field of view, and favorable for satisfying the machining and production requirement.

In the exemplary embodiment, the optical imaging lens assembly according to the disclosure may satisfy $-4.0$ mm$<R8/N4<-2.0$ mm, wherein R8 is a curvature radius of an image-side surface of the fourth lens, and N4 is a refractive index of the fourth lens. More specifically, R8 and N4 may further satisfy $-3.7$ mm$<R8/N4<-2.1$ mm. Satisfying $-4.0$ mm$<R8/N4<-2.0$ mm is favorable for correcting an astigmatism aberration of the optical imaging lens assembly.

In the exemplary embodiment, the optical imaging lens assembly according to the disclosure may satisfy $-5.0$ mm$^{-1}<V5/R9<-2.5$ mm$^{-1}$, wherein R9 is a curvature radius of an object-side surface of the fifth lens, and V5 is an abbe number of the fifth lens. Satisfying $-5.0 \text{ mm}^{-1}<V5/R9<-2.5 \text{ mm}^{-1}$ is favorable for reducing the aberration of the optical imaging lens assembly.

In the exemplary embodiment, the optical imaging lens assembly according to the disclosure further includes a diaphragm arranged between the second lens and the third lens. Optionally, the optical imaging lens assembly above may further include an optical filter configured to correct the chromatic aberration and/or protective glass configured to protect a photosensitive element on the imaging surface. The disclosure provides an optical imaging lens assembly with the characteristics of small size, wide angle, large image surface, high imaging quality, etc. The optical imaging lens assembly according to the embodiment of the disclosure may adopt multiple lenses, for example, the abovementioned six. The refractive power and surface types of each lens, the center thickness of each lens, on-axis distances between the lenses and the like may be reasonably configured to effectively converge incident light, reduce an optical total track length of the imaging lens, improve the machinability of the imaging lens and ensure that the optical imaging lens assembly is more favorable for production and machining.

In the embodiment of the disclosure, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatism aberrations. With adoption of the aspheric lens, aberrations during imaging may be eliminated as much as possible, thereby improving the imaging quality. Optionally, at least one of the object-side surface and the image-side surface of each lens in the first lens, the second lens, the third lens, the fourth lens, the fifth lens and the sixth lens is an aspheric mirror surface. Optionally, both the object-side surface and the image-side surface of each lens in the first lens, the second lens, the third lens, the fourth lens, the fifth lens and the sixth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with six lenses as an example, the optical imaging lens assembly is not limited to six lenses. If necessary, the optical imaging lens assembly may further include another number of lenses.

Specific embodiments applied to the optical imaging lens assembly of the abovementioned embodiment will further be described below with reference to the drawings.

Embodiment 1

An optical imaging lens assembly according to Embodiment 1 of the disclosure will be described below with reference to FIGS. 1-2D. FIG. 1 shows a structural schematic diagram of an optical imaging lens assembly according to Embodiment 1 of the disclosure.

As shown in FIG. 1, the optical imaging lens assembly sequentially includes from an object side to an image side: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

Table 1 shows a basic parameter table of the optical imaging lens assembly of Embodiment 1, wherein the units of the curvature radius, the thickness/distance and the focal length are all millimeters (mm).

TABLE 1

| Surface number | Surface type | Curvature radius | Thickness/ distance | Material Refractive Index | Abbe number | Focal length | Conic coefficient |
|---|---|---|---|---|---|---|---|
| OBJ | Spherical | Infinite | Infinite | | | | |
| S1 | Aspheric | −11.6561 | 1.5020 | 1.54 | 55.6 | −5.53 | −68.4083 |
| S2 | Aspheric | 4.1606 | 1.6604 | | | | −0.9946 |
| S3 | Aspheric | 4.6336 | 0.9265 | 1.65 | 23.5 | 22.18 | 0.6968 |
| S4 | Aspheric | 6.3178 | 1.1251 | | | | −0.1843 |
| STO | Spherical | Infinite | −0.0436 | | | | |
| S5 | Aspheric | 15.1480 | 2.5226 | 1.55 | 56.1 | 7.80 | 18.4619 |
| S6 | Aspheric | −5.5787 | 0.3109 | | | | −0.2363 |
| S7 | Aspheric | 12.8553 | 2.6500 | 1.60 | 61.5 | 6.78 | 3.1684 |
| S8 | Aspheric | −5.5010 | 0.0500 | | | | −0.6887 |
| S9 | Aspheric | −7.8586 | 0.9465 | 1.67 | 20.3 | −7.43 | −8.9311 |
| S10 | Aspheric | 14.0723 | 0.9809 | | | | 7.7527 |
| S11 | Aspheric | 4.5729 | 2.8160 | 1.54 | 55.6 | 21.83 | −0.6588 |
| S12 | Aspheric | 5.8860 | 1.4705 | | | | −0.5470 |
| S13 | Spherical | Infinite | 0.3000 | 1.52 | 64.2 | | |

TABLE 1-continued

| Surface number | Surface type | Curvature radius | Thickness/ distance | Material Refractive Index | Abbe number | Focal length | Conic coefficient |
|---|---|---|---|---|---|---|---|
| S14 | Spherical | Infinite | 1.3700 | | | | |
| S15 | Spherical | Infinite | | | | | |

In the embodiment, a total effective focal length f of the optical imaging lens assembly is 4.96 mm, a Total Track Length (TTL) (i.e., a distance on an optical axis from the object-side surface S1 of the first lens E1 to the imaging surface S15 of the optical imaging lens assembly) of the optical imaging lens assembly is 18.59 mm, ImgH is a half of a diagonal length of an effective pixel region on the imaging surface S15 of the optical imaging lens assembly, and ImgH is 7.68 mm, Semi-FOV is a half of a maximum field of view of the optical imaging lens assembly, and Semi-FOV is 77.4', and an F-number (Fno) of the optical imaging lens assembly is 2.99.

In Embodiment 1, both the object-side surface and the image-side surface of any lens in the first lens E1 to the sixth lens E6 are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a vector height of a distance between the aspheric surface and a vertex of the aspheric surface when the aspheric surface is located at a position with the height h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 shows higher-order coefficients A4, A6, A8, A10, A12, A14, and A16 applied to each of the aspheric mirror surfaces S1-S12 in Embodiment 1.

TABLE 2

| Surface number | A4 | A6 | A8 | A10 | A12 | A14 | A16 |
|---|---|---|---|---|---|---|---|
| S1 | 1.7627E−03 | −9.0644E−05 | 3.5165E−06 | −9.0132E−08 | 1.4337E−09 | −1.2773E−11 | 4.8580E−14 |
| S2 | 8.1412E−03 | −1.9946E−03 | 6.4585E−04 | −1.3181E−04 | 1.6069E−05 | −1.0205E−06 | 2.5169E−08 |
| S3 | 1.7600E−03 | −4.6687E−04 | 9.4660E−04 | −4.5170E−04 | 1.2086E−04 | −1.6698E−05 | 8.5005E−07 |
| S4 | 1.1632E−02 | 2.4285E−03 | −8.8590E−04 | 7.9161E−04 | −2.7390E−04 | 4.9264E−05 | −4.1661E−06 |
| S5 | 1.9177E−03 | 4.9773E−03 | −7.9627E−03 | 8.1292E−03 | −4.6122E−03 | 1.3696E−03 | −1.6596E−04 |
| S6 | −1.0095E−02 | 4.1763E−03 | −7.6622E−04 | −2.6665E−06 | 3.1182E−05 | −5.2490E−06 | 2.9934E−07 |
| S7 | −1.0993E−02 | 4.0573E−03 | −8.6088E−04 | 1.1678E−04 | −9.7971E−06 | 4.6345E−07 | −9.4976E−09 |
| S8 | −9.2625E−03 | 1.0127E−03 | 3.6924E−04 | −1.2373E−04 | 1.5009E−05 | −8.4477E−07 | 1.8419E−08 |
| S9 | −3.6922E−03 | −2.9472E−04 | 4.0947E−04 | −1.1635E−04 | 1.3627E−05 | −7.6133E−07 | 1.7037E−08 |
| S10 | −2.6639E−03 | 8.4083E−04 | −1.6759E−04 | 1.6617E−05 | −9.0559E−07 | 2.6091E−08 | −3.1352E−10 |
| S11 | −1.4028E−02 | 1.2744E−03 | −9.8329E−05 | 5.1154E−06 | −1.5882E−07 | 2.6266E−09 | −1.7766E−11 |
| S12 | −6.9456E−03 | 3.6444E−04 | −1.6159E−05 | 4.4550E−07 | −8.0331E−09 | 9.7327E−11 | −6.4787E−13 |

Figure 2A:
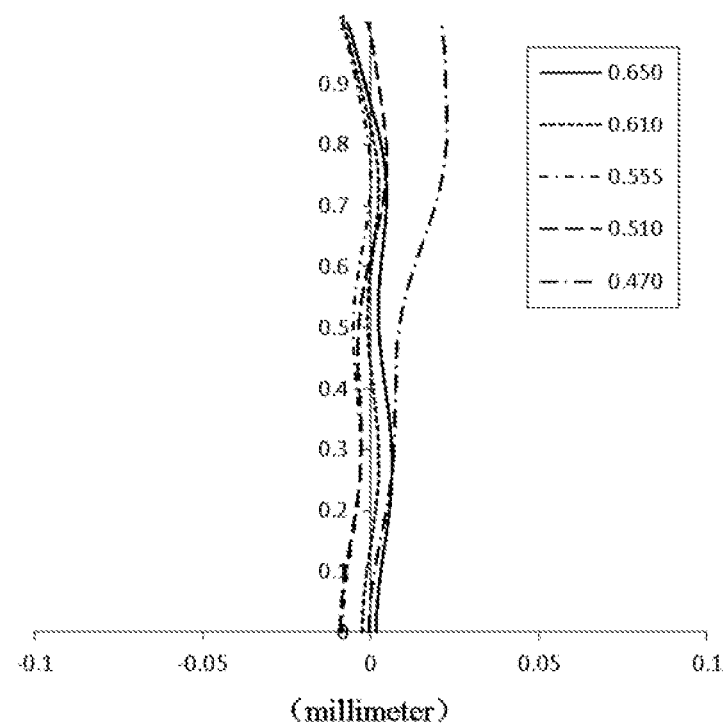
FIGS. 2A-2D show a longitudinal aberration curve, an astigmatism curve, a distortion curve, and a lateral color curve of an optical imaging lens assembly according to Embodiment 1 respectively.
Figure 2B:
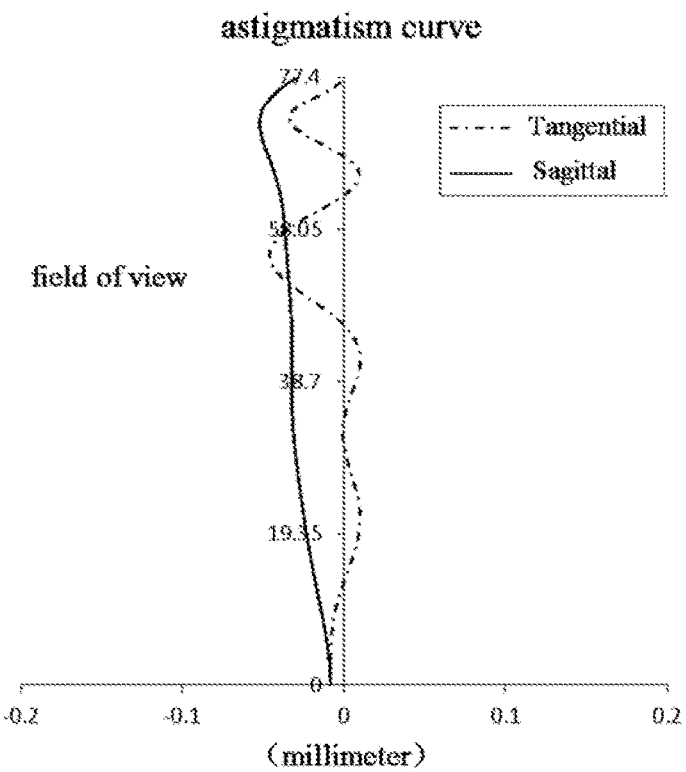
Figure 2C:
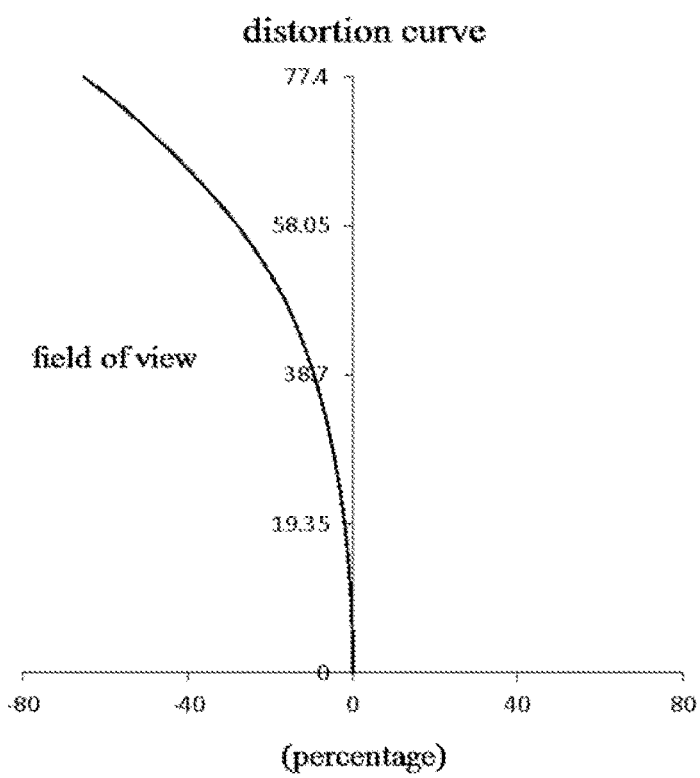
Figure 2D:
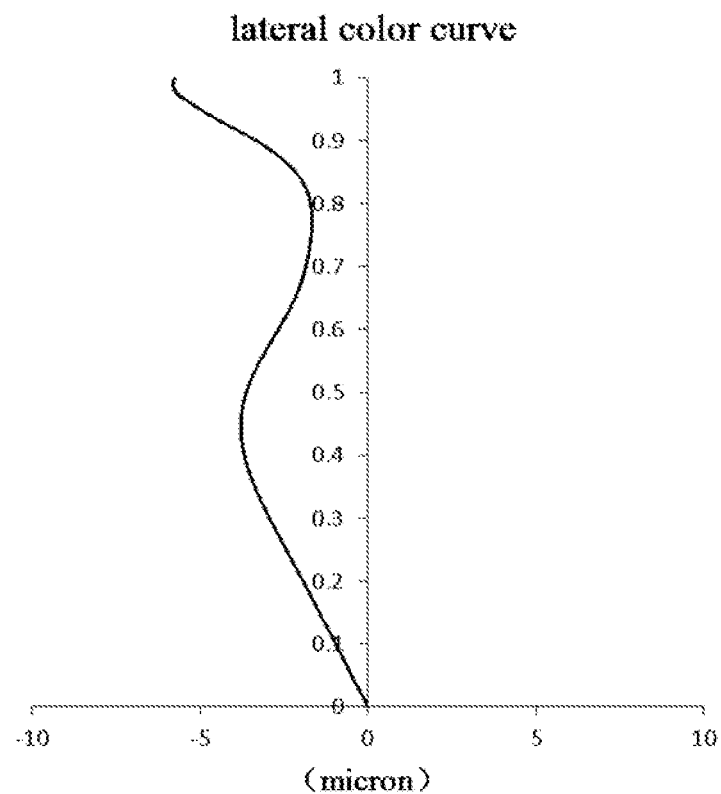

FIG. 2A shows a longitudinal aberration curve of the optical imaging lens assembly according to Embodiment 1 to represent deviation of a convergence focal point after light with different wavelengths passes through the lens. FIG. 2B shows an astigmatism curve of the optical imaging lens assembly according to Embodiment 1 to represent a curvature of tangential image surface and a curvature of sagittal image surface. FIG. 2C shows a distortion curve of the optical imaging lens assembly according to Embodiment 1 to represent distortion values corresponding to different fields of view. FIG. 2D shows a lateral color curve of the optical imaging lens assembly according to Embodiment 1 to represent deviation of different image heights on the imaging surface after the light passes through the lens. According to FIGS. 2A-2D, it can be seen that the optical imaging lens assembly provided in Embodiment 1 may achieve high imaging quality.

Embodiment 2

Figure 3:
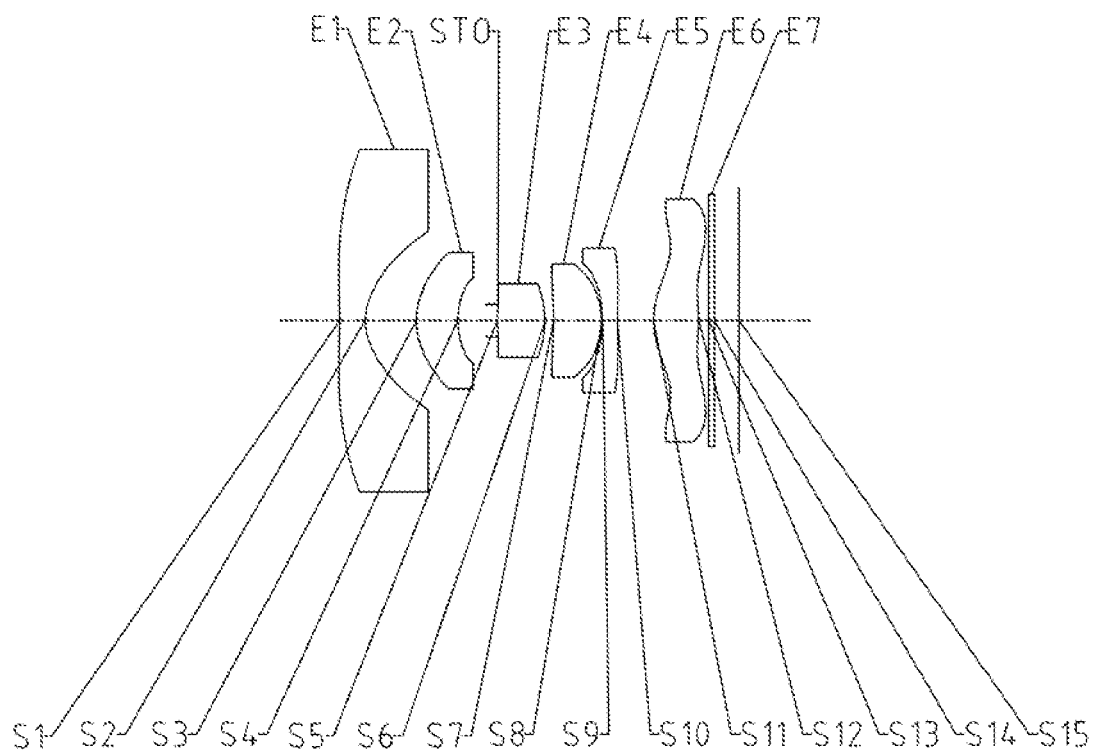
FIG. 3 shows a structural schematic diagram of an optical imaging lens assembly according to Embodiment 2 of the disclosure.

An optical imaging lens assembly according to Embodiment 2 of the disclosure will be described below with reference to FIGS. 3-4D. In the embodiment and the following embodiments, part of descriptions similar to those about embodiment is omitted for simplicity. FIG. 3 shows a structural schematic diagram of an optical imaging lens assembly according to Embodiment 2 of the disclosure.

As shown in FIG. 3, the optical imaging lens assembly sequentially includes from an object side to an image side: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a convex surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 2.88 mm, a Total Track Length (TTL) of the optical imaging lens assembly is 22.00 mm, ImgH is a half of a diagonal length of an effective pixel region on the imaging surface S15 of the optical imaging lens assembly, and ImgH is 7.73 mm, Semi-FOV is a half of a maximum field of view of the optical imaging lens assembly, and Semi-FOV is 77.4°, and an Fno of the optical imaging lens assembly is 3.00.

Table 3 shows a basic parameter table of the optical imaging lens assembly of Embodiment 2, wherein the units of the curvature radius, the thickness/distance and the focal length are all millimeters (mm). Table 4 shows high-order coefficients applied to each of aspheric mirror surfaces in Embodiment 2. A surface type of each aspheric surface may be defined by formula (1) given in Embodiment 1.

Figure 4A:
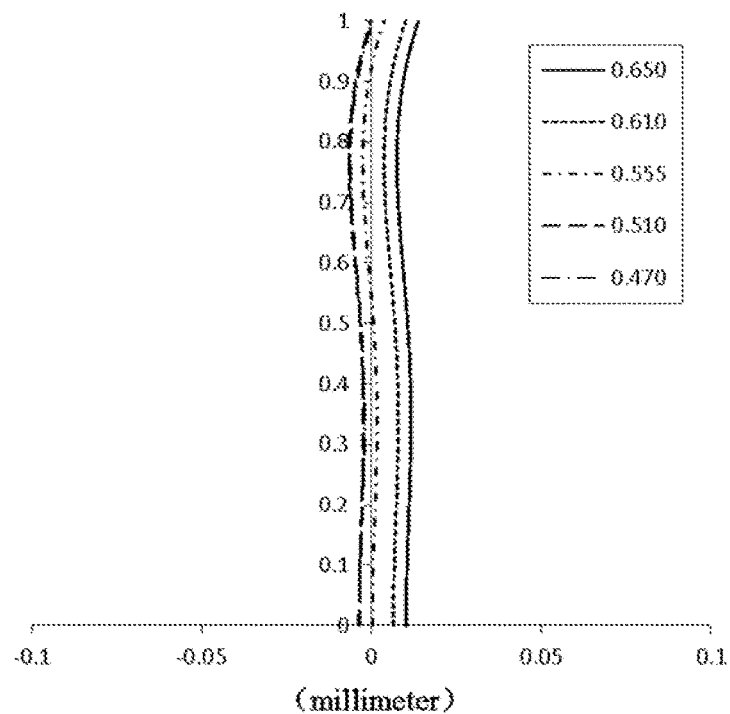
FIGS. 4A-4D show a longitudinal aberration curve, an astigmatism curve, a distortion curve, and a lateral color curve of an optical imaging lens assembly according to Embodiment 2 respectively.
Figure 4B:
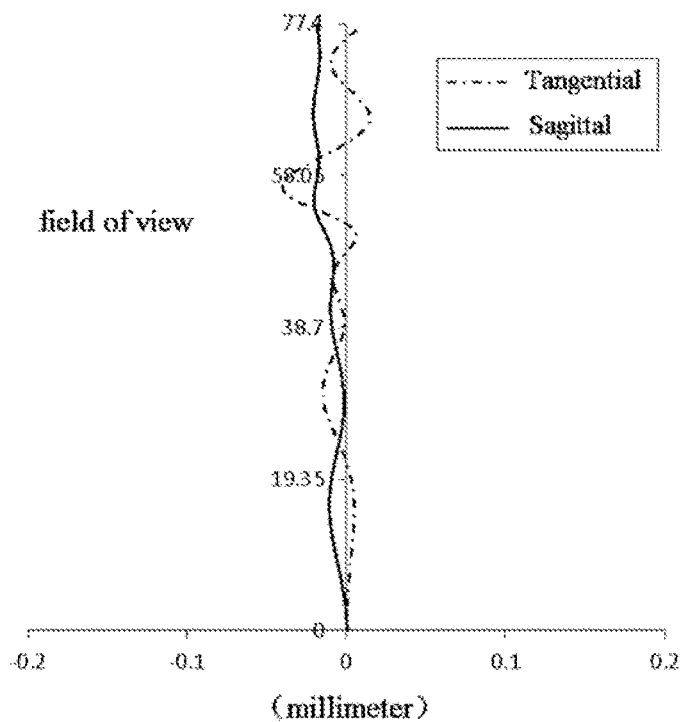
Figure 4C:
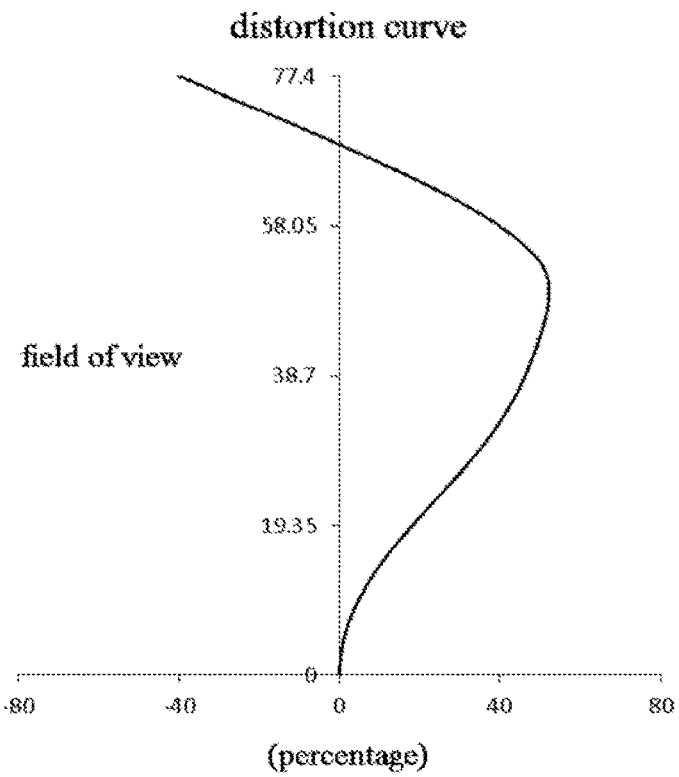
Figure 4D:
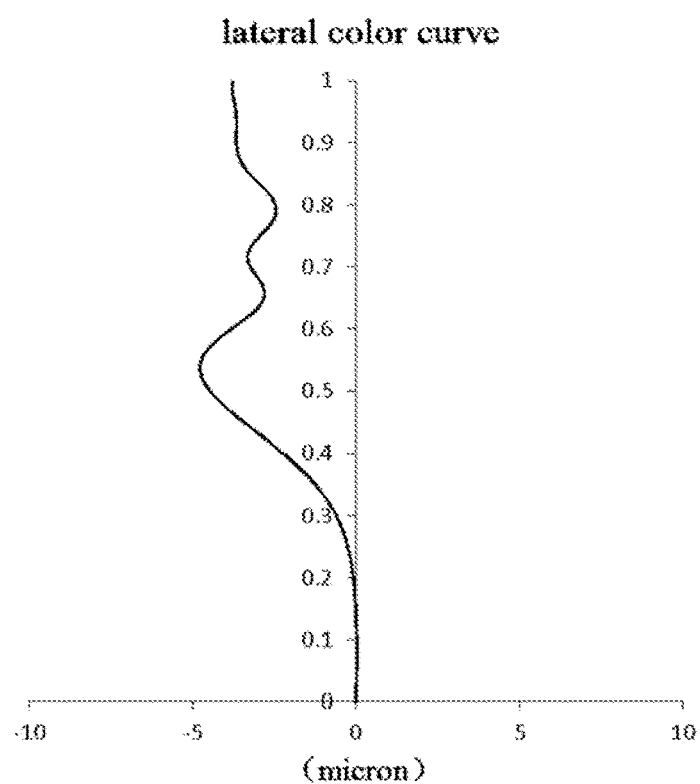

FIG. 4A shows a longitudinal aberration curve of the optical imaging lens assembly according to Embodiment 2 to represent deviation of a convergence focal point after light with different wavelengths passes through the lens. FIG. 4B shows an astigmatism curve of the optical imaging lens assembly according to Embodiment 2 to represent a curvature of tangential image surface and a curvature of sagittal image surface. FIG. 4C shows a distortion curve of the optical imaging lens assembly according to Embodiment 2 to represent distortion values corresponding to different fields of view. FIG. 4D shows a lateral color curve of the optical imaging lens assembly according to Embodiment 2 to represent deviation of different image heights on the imaging surface after the light passes through the lens. According to FIGS. 4A-4D, it can be seen that the optical imaging lens assembly provided in Embodiment 2 may achieve high imaging quality.

Embodiment 3

Figure 5:
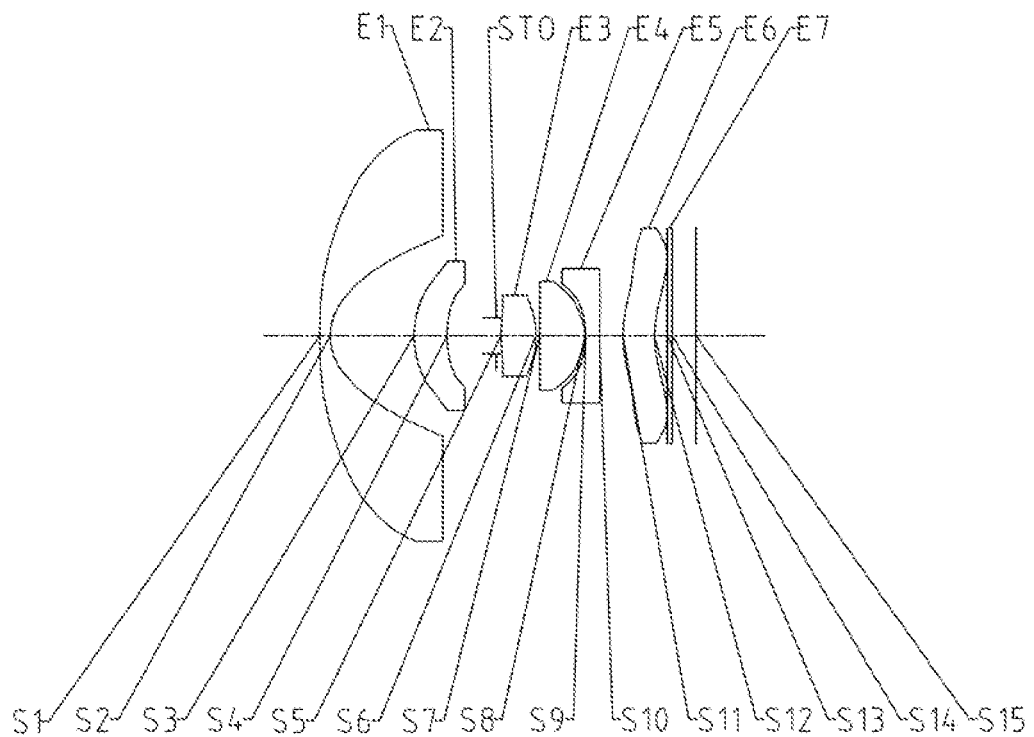
FIG. 5 shows a structural schematic diagram of an optical imaging lens assembly according to Embodiment 3 of the disclosure.

An optical imaging lens assembly according to Embodiment 3 of the disclosure is described below with reference to FIGS. 5-6D. FIG. 5 shows a structural schematic diagram of an optical imaging lens assembly according to Embodiment 3 of the disclosure.

As shown in FIG. 5, the optical imaging lens assembly sequentially includes from an object side to an image side: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an

TABLE 3

| Surface number | Surface type | Curvature radius | Thickness/ distance | Material Refractive Index | Abbe number | Focal length | Conic coefficient |
|---|---|---|---|---|---|---|---|
| OBJ | Spherical | Infinite | Infinite | | | | |
| S1 | Aspheric | −56.0598 | 1.3956 | 1.54 | 55.6 | −4.90 | −96.5817 |
| S2 | Aspheric | 2.7827 | 2.8256 | | | | −3.7245 |
| S3 | Aspheric | 4.0447 | 2.2880 | 1.65 | 23.5 | 17.11 | −1.5484 |
| S4 | Aspheric | 4.9708 | 2.2867 | | | | −2.8751 |
| STO | Spherical | Infinite | −0.1131 | | | | 0.0000 |
| S5 | Aspheric | 9.8930 | 2.6373 | 1.55 | 56.1 | 6.41 | 26.1832 |
| S6 | Aspheric | −4.9080 | 0.4720 | | | | −1.6370 |
| S7 | Aspheric | −226.5752 | 2.6500 | 1.53 | 66.2 | 8.26 | 99.0000 |
| S8 | Aspheric | −4.3300 | 0.0500 | | | | −0.5593 |
| S9 | Aspheric | −6.0800 | 0.8000 | 1.67 | 20.3 | −6.88 | −12.9992 |
| S10 | Aspheric | 19.6642 | 1.9943 | | | | 6.7961 |
| S11 | Aspheric | 4.4758 | 2.5051 | 1.54 | 55.6 | 5.09 | −0.6521 |
| S12 | Aspheric | −5.6397 | 0.5417 | | | | −2.2280 |
| S13 | Spherical | Infinite | 0.3000 | 1.52 | 64.2 | | |
| S14 | Spherical | Infinite | 1.3700 | | | | |
| S15 | Spherical | Infinite | | | | | |

TABLE 4

| Surface number | A4 | A6 | A8 | A10 | A12 | A14 | A16 |
|---|---|---|---|---|---|---|---|
| S1 | 4.6477E−04 | −1.4732E−06 | −1.2465E−07 | 2.6262E−09 | −2.3574E−11. | 1.0263E−13 | −1.7716E−16 |
| S2 | 2.8727E−03 | −4.1367E−05 | 1.0726E−05 | −7.1957E−07 | −3.3464E−09 | 1.0520E−09 | −1.6584E−11 |
| S3 | −3.4715E−03 | 1.3273E−03 | −1.8236E−04 | 1.5866E−05 | −1.0631E−06 | 4.9736E−08 | −1.0246E−09 |
| S4 | 3.4640E−03 | 2.5343E−03 | −5.7260E−04 | −2.0901E−05 | 4.4465E−05 | −8.3579E−06 | 5.6071E−07 |
| S5 | −3.1203E−03 | 3.1269E−03 | −4.8854E−03 | 3.6211E−03 | −1.6301E−03 | 3.9450E−04 | −4.0152E−05 |
| S6 | −6.5522E−03 | 3.8981E−03 | −1.0261E−03 | 1.6508E−04 | −5.8831E−06 | −1.6502E−06 | 1.4220E−07 |
| S7 | −1.2615E−02 | 4.6649E−03 | −1.0699E−03 | 1.5681E−04 | −1.3624E−05 | 6.5289E−07 | −1.3870E−08 |
| S8 | 9.2053E−04 | −1.2354E−03 | 1.4267E−04 | 1.5942E−05 | −5.8686E−06 | 5.1816E−07 | −1.4720E−08 |
| S9 | −1.0335E−03 | −1.6705E−03 | 2.9537E−04 | −1.5387E−05 | −1.5565E−06 | 1.8989E−07 | −5.2145E−09 |
| S10 | −4.8205E−03 | 1.4503E−06 | 6.1457E−05 | −6.9807E−06 | 3.4977E−07 | −8.4279E−09 | 7.9235E−11 |
| S11 | −3.7033E−03 | 1.4538E−04 | −2.6611E−05 | 1.6520E−06 | −4.6468E−08 | 6.2417E−10 | −3.2837E−12 |
| S12 | 2.1485E−02 | −2.0199E−03 | 1.0511E−04 | −3.3319E−06 | 6.3021E−08 | −6.5304E−10 | 2.8439E−12 | image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 3.42 mm, a Total Track Length (TTL) of the optical imaging lens assembly is 22.00 mm, ImgH is a half of a diagonal length of an effective pixel region on the imaging surface S15 of the optical imaging lens assembly, and ImgH is 6.30 mm, Semi-FOV is a half of a maximum field of view of the optical imaging lens assembly, and Semi-FOV is 70.0°, and an Fno of the optical imaging lens assembly is 3.20.

Table 5 shows a basic parameter table of the optical imaging lens assembly of Embodiment 3, wherein the units of the curvature radius, the thickness/distance and the focal length are all millimeters (mm). Table 6 shows high-order coefficients applied to each of aspheric mirror surfaces in Embodiment 3. A surface type of each aspheric surface may be defined by formula (1) given in Embodiment 1.

TABLE 5

| Surface number | Surface type | Curvature radius | Thickness/ distance | Refractive Index | Abbe number | Focal length | Conic coefficient |
|---|---|---|---|---|---|---|---|
| OBJ | Spherical | Infinite | Infinite | | | | |
| S1 | Aspheric | 58.4920 | 0.6000 | 1.54 | 55.6 | −6.19 | 21.0208 |
| S2 | Aspheric | 3.1332 | 4.9133 | | | | −2.7747 |
| S3 | Aspheric | 5.1628 | 1.9259 | 1.65 | 23.5 | 19.87 | −0.7004 |
| S4 | Aspheric | 7.3838 | 2.8842 | | | | 1.4391 |
| STO | Spherical | Infinite | 0.2826 | | | | |
| S5 | Aspheric | 11.8330 | 2.0455 | 1.55 | 56.1 | 8.43 | −68.8351 |
| S6 | Aspheric | −7.0764 | 0.2105 | | | | −8.8807 |
| S7 | Aspheric | 26.9846 | 2.6513 | 1.57 | 63.0 | 5.31 | −57.0340 |
| S8 | Aspheric | −3.3227 | 0.0500 | | | | −2.3263 |
| S9 | Aspheric | −5.9619 | 0.8000 | 1.67 | 20.3 | −7.41 | −1.8507 |
| S10 | Aspheric | 30.6037 | 1.3905 | | | | 37.1754 |
| S11 | Aspheric | 8.3264 | 1.8443 | 1.54 | 55.6 | −997.03 | 0.0957 |
| S12 | Aspheric | 7.5645 | 0.7368 | | | | −16.9047 |
| S13 | Spherical | Infinite | 0.3000 | 1.52 | 64.2 | | |
| S14 | Spherical | Infinite | 1.3700 | | | | |
| S15 | Spherical | Infinite | | | | | |

TABLE 6

| Surface number | A4 | A6 | A8 | A10 | A12 | A14 | A16 |
|---|---|---|---|---|---|---|---|
| S1 | 9.0480E−04 | −2.4392E−05 | 3.5001E−07 | −2.7318E−09 | 1.1250E−11 | −2.0453E−14 | 9.0851E−18 |
| S2 | 5.8700E−03 | −3.6778E−04 | 3.3086E−05 | −1.8673E−06 | 5.7586E−08 | −9.0463E−10 | 5.6452E−12 |
| S3 | −2.6456E−03 | 3.4368E−04 | −2.4306E−06 | −1.7703E−06 | 1.7221E−07 | −8.1502E−09 | 1.4308E−10 |
| S4 | −1.7102E−03 | 1.0689E−03 | −1.3806E−04 | 2.0603E−05 | −2.6650E−06 | 2.0907E−07 | −7.1244E−09 |
| S5 | 3.0813E−03 | −1.5324E−03 | 2.9677E−05 | 6.2489E−04 | −4.7013E−04 | 1.4358E−04 | −1.7467E−05 |
| S6 | −8.2429E−03 | −1.0869E−04 | −4.8391E−05 | 1.1366E−04 | −2.7339E−05 | 2.9368E−06 | −1.4138E−07 |
| S7 | −3.6309E−03 | 1.8744E−04 | −1.9896E−04 | 8.5442E−05 | −1.3572E−05 | 1.0117E−06 | −3.0971E−08 |
| S8 | −4.2239E−03 | 1.4845E−03 | −6.5747E−04 | 1.3483E−04 | −1.6420E−05 | 1.1006E−06 | −3.0616E−08 |
| S9 | −3.3072E−03 | 7.7003E−05 | −3.4012E−06 | 1.0513E−04 | −1.4429E−05 | 9.0721E−07 | −2.1282E−08 |
| S10 | 1.4994E−03 | −1.4297E−03 | 2.5528E−04 | −2.3517E−05 | 1.2239E−06 | −3.4143E−08 | 3.9766E−10 |
| S11 | −3.8373E−04 | −1.2961E−04 | −2.1993E−06 | 6.4726E−07 | −2.6859E−08 | 4.6843E−10 | −3.1084E−12 |
| S12 | 2.4084E−03 | −2.3427E−04 | 5.6641E−06 | 1.7745E−07 | −1.4691E−08 | 3.3348E−10 | −2.5928E−12 |

Figure 6A:
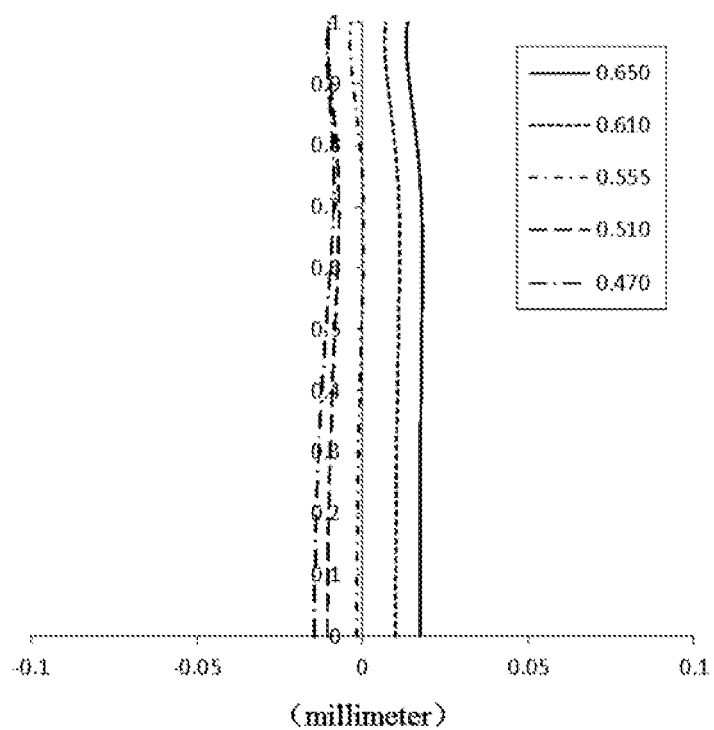
FIGS. 6A-6D show a longitudinal aberration curve, an astigmatism curve, a distortion curve, and a lateral color curve of an optical imaging lens assembly according to Embodiment 3 respectively.
Figure 6B:
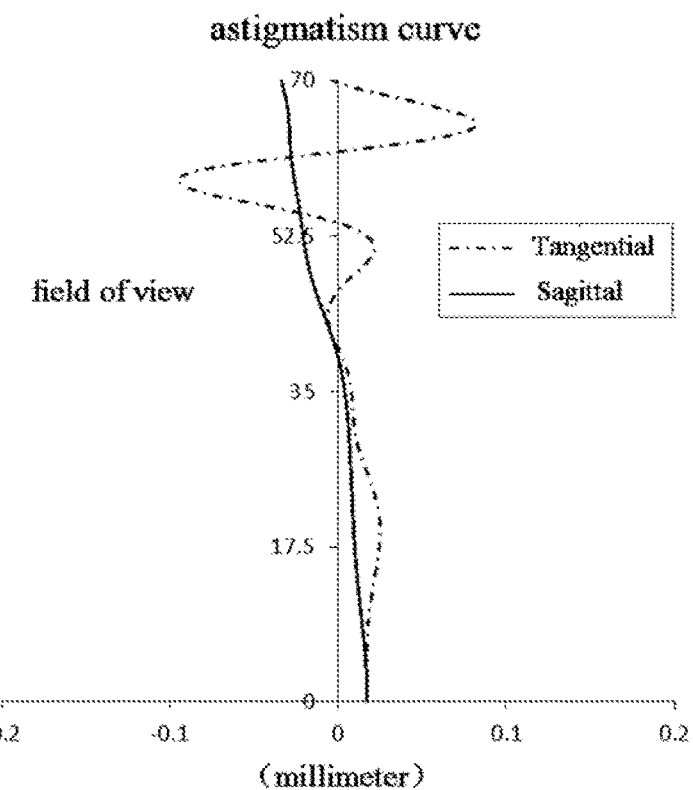
Figure 6C:
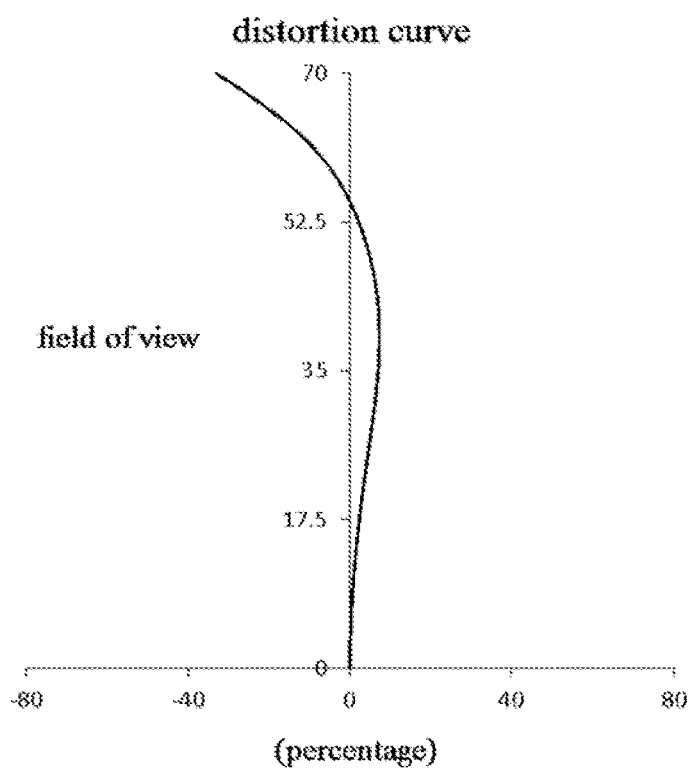
Figure 6D:
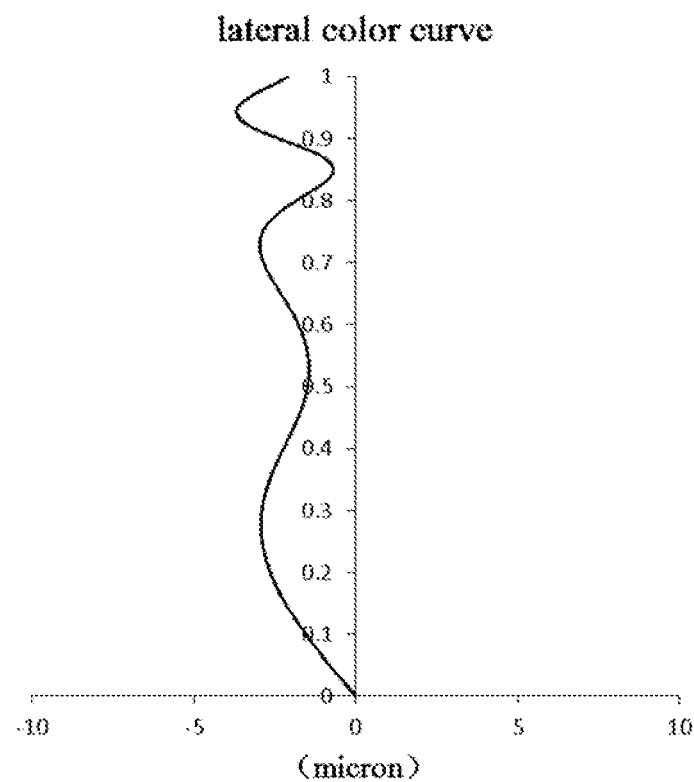

FIG. 6A shows a longitudinal aberration curve of the optical imaging lens assembly according to Embodiment 3 to represent deviation of a convergence focal point after light with different wavelengths passes through the lens. FIG. 6B shows an astigmatism curve of the optical imaging lens assembly according to Embodiment 3 to represent a curvature of tangential image surface and a curvature of sagittal image surface. FIG. 6C shows a distortion curve of the optical imaging lens assembly according to Embodiment 3 to represent distortion values corresponding to different fields of view. FIG. 6D shows a lateral color curve of the optical imaging lens assembly according to Embodiment 3 to represent deviation of different image heights on the imaging surface after the light passes through the lens. According to FIGS. 6A-6D, it can be seen that the optical imaging lens assembly provided in Embodiment 3 may achieve high imaging quality.

Embodiment 4

Figure 7:
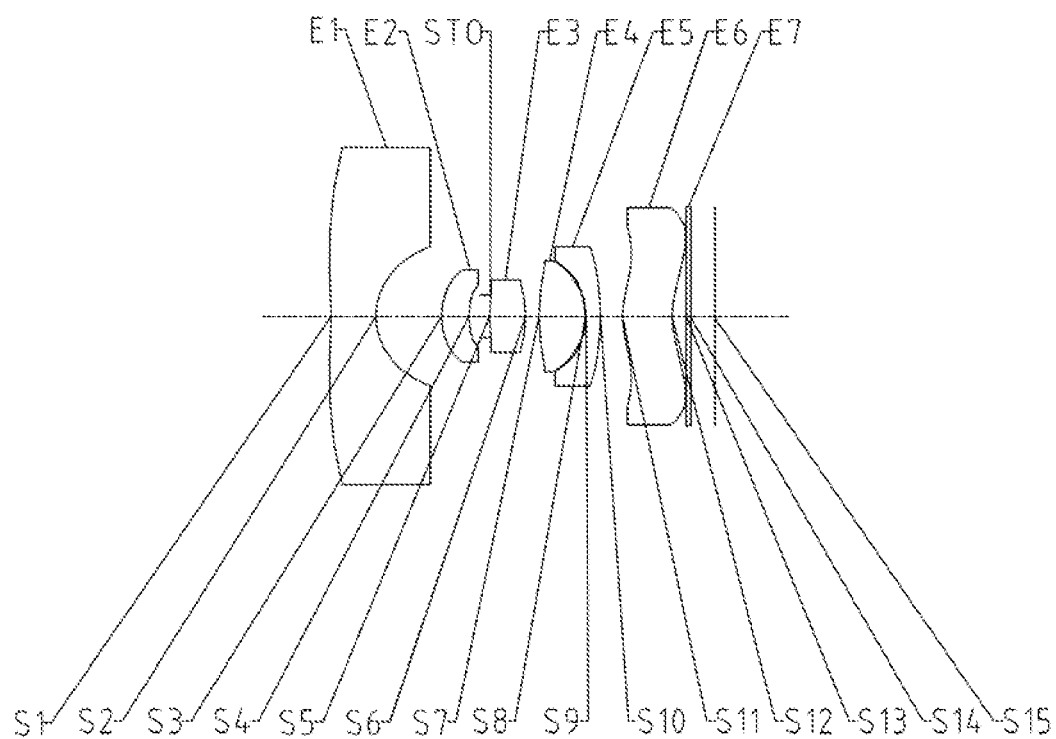
FIG. 7 shows a structural schematic diagram of an optical imaging lens assembly according to Embodiment 4 of the disclosure.

An optical imaging lens assembly according to Embodiment 4 of the disclosure is described below with reference to FIGS. 7-8D. FIG. 7 shows a structural schematic diagram of an optical imaging lens assembly according to Embodiment 4 of the disclosure.

As shown in FIG. 7, the optical imaging lens assembly sequentially includes from an object side to an image side: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, while an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 4.08 mm, a Total Track Length (TTL) of the optical imaging lens assembly is 21.94 mm, ImgH is a half of a diagonal length of an effective pixel region on the imaging surface S15 of the optical imaging lens assembly, and ImgH is 6.35 mm, Semi-FOV a half of a maximum field of view of the optical imaging lens assembly, and Semi-FOV is 75.0°, and an Fno of the optical imaging lens assembly is 3.00.

Table 7 shows a basic parameter table of the optical imaging lens assembly of Embodiment 4, wherein the units of the curvature radius, the thickness/distance and the focal length are all millimeters (mm). Table 8 shows high-order coefficients applied to each of aspheric mirror surfaces in Embodiment 4. A surface type of each aspheric surface may be defined by formula (1) given in Embodiment 1.

TABLE 7

| Surface number | Surface type | Curvature radius | Thickness/ distance | Material Refractive Index | Abbe number | Focal length | Conic coefficient |
|---|---|---|---|---|---|---|---|
| OBJ | Spherical | Infinite | Infinite | | | | |
| S1 | Aspheric | −20.3224 | 2.5580 | 1.54 | 55.6 | −6.05 | −90.9472 |
| S2 | Aspheric | 4.0336 | 3.7542 | | | | −0.8441 |
| S3 | Aspheric | 4.4018 | 1.5475 | 1.65 | 23.5 | 29.58 | 0.9651 |
| S4 | Aspheric | 4.9345 | 1.2493 | | | | −0.5391 |
| STO | Spherical | Infinite | −0.0581 | | | | |
| S5 | Aspheric | 11.7877 | 2.0504 | 1.55 | 56.1 | 8.55 | 25.9744 |
| S6 | Aspheric | −7.2568 | 0.7715 | | | | −1.4279 |
| S7 | Aspheric | 10.4954 | 2.6521 | 1.51 | 68.0 | 6.25 | 0.8259 |
| S8 | Aspheric | −4.2140 | 0.0500 | | | | −0.0093 |
| S9 | Aspheric | −4.1262 | 0.8000 | 1.67 | 20.3 | −8.01 | −2.0868 |
| S10 | Aspheric | −19.5362 | 1.2628 | | | | −73.2634 |
| S11 | Aspheric | 4.1070 | 2.8363 | 1.54 | 55.6 | 26.29 | −0.7297 |
| S12 | Aspheric | 4.3959 | 0.7945 | | | | −0.6597 |
| S13 | Spherical | Infinite | 0.3000 | 1.52 | 64.2 | | |
| S14 | Spherical | Infinite | 1.3700 | | | | |
| S15 | Spherical | Infinite | | | | | |

TABLE 8

| Surface number | A4 | A6 | A8 | A10 | A12 | A14 | A16 |
|---|---|---|---|---|---|---|---|
| S1 | 9.4506E−04 | −3.2852E−05 | 7.0288E−07 | −9.1808E−09 | 7.1883E−11 | −3.1158E−13 | 5.7654E−16 |
| S2 | 3.8066E−03 | −2.1252E−04 | 4.2955E−05 | −5.6360E−06 | 3.7487E−07 | −8.6589E−09 | 1.6045E−11 |
| S3 | 1.4136E−03 | 2.8679E−04 | −9.6595E−05 | 3.3498E−05 | −6.4579E−06 | 7.5206E−07 | −4.4430E−08 |
| S4 | 1.1887E−02 | 1.2398E−03 | 2.9969E−04 | −2.0588E−04 | 1.5928E−04 | −4.5209E−05 | 4.7006E−06 |
| S5 | 5.5911E−04 | 5.1932E−03 | −1.0790E−02 | 1.2795E−02 | −8.2466E−03 | 2.7072E−03 | −3.5045E−04 |

TABLE 8-continued

| Surface number | A4 | A6 | A8 | A10 | A12 | A14 | A16 |
|---|---|---|---|---|---|---|---|
| S6 | −4.0310E−03 | 1.1525E−03 | −3.5377E−04 | 9.0504E−05 | −9.7804E−06 | 1.8890E−07 | 8.3816E−08 |
| S7 | −4.3623E−03 | 9.5241E−04 | −1.5486E−04 | 1.8924E−05 | −1.7454E−06 | 1.0931E−07 | −3.3404E−09 |
| S8 | −1.1761E−02 | 3.3769E−03 | −5.1454E−04 | 2.8714E−05 | 9.0684E−07 | −1.6476E−07 | 4.9533E−09 |
| S9 | −7.8053E−03 | 2.1480E−03 | −3.8418E−04 | 3.9352E−06 | 3.8954E−06 | −3.6354E−07 | 1.1212E−08 |
| S10 | −5.5604E−03 | 1.7178E−03 | −3.1075E−04 | 3.0369E−05 | −1.6766E−06 | 4.9781E−08 | −6.1178E−10 |
| S11 | −1.4559E−02 | 1.3501E−03 | −1.0958E−04 | 5.9020E−06 | −1.9044E−07 | 3.3056E−09 | −2.3628E−11 |
| S12 | −1.1035E−02 | 9.2674E−04 | −5.8152E−05 | 2.1984E−06 | −4.9020E−08 | 5.8159E−10 | −2.8287E−12 |

Figure 8A:
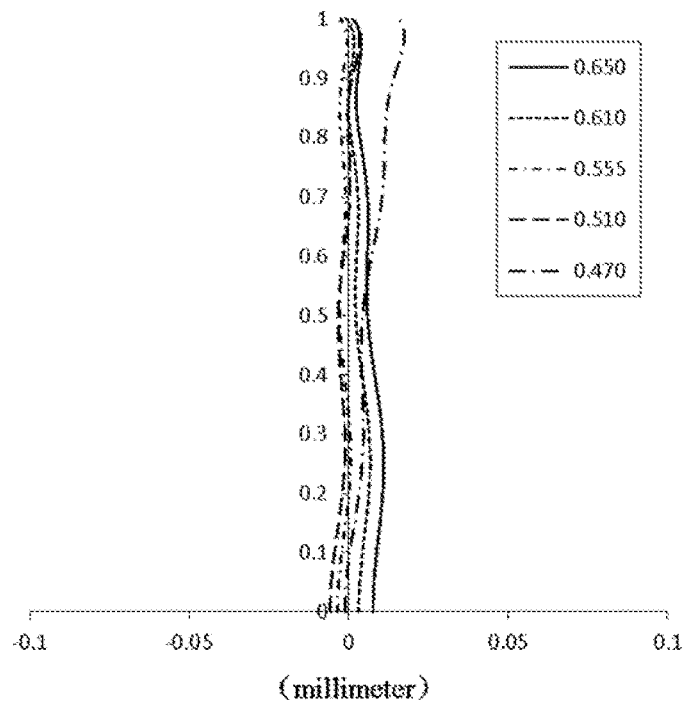
FIGS. 8A-8D show a longitudinal aberration curve, an astigmatism curve, a distortion curve, and a lateral color curve of an optical imaging lens assembly according to Embodiment 4 respectively.
Figure 8B:
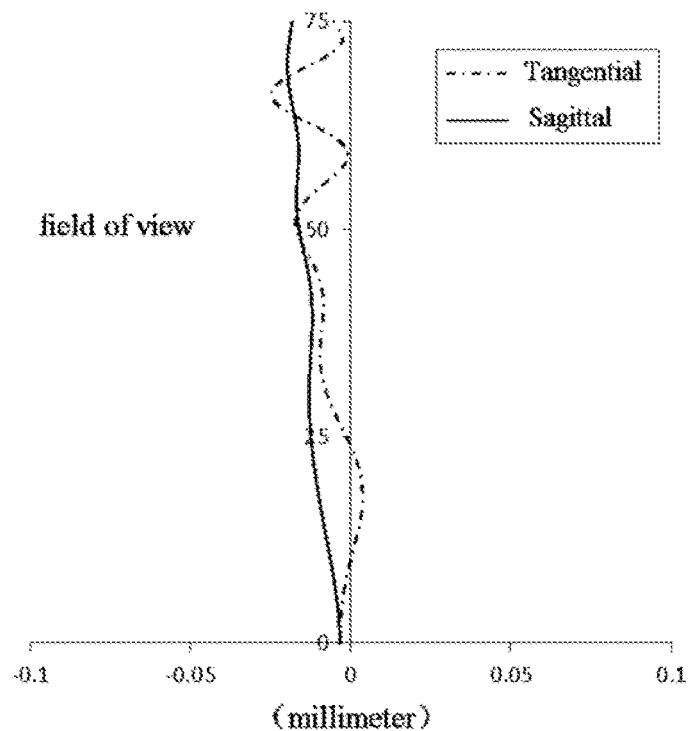
Figure 8C:
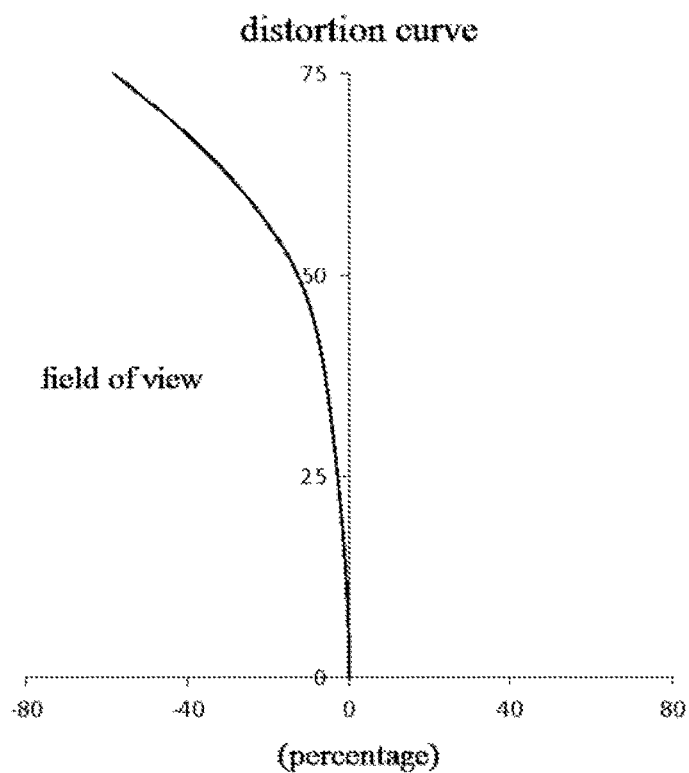
Figure 8D:
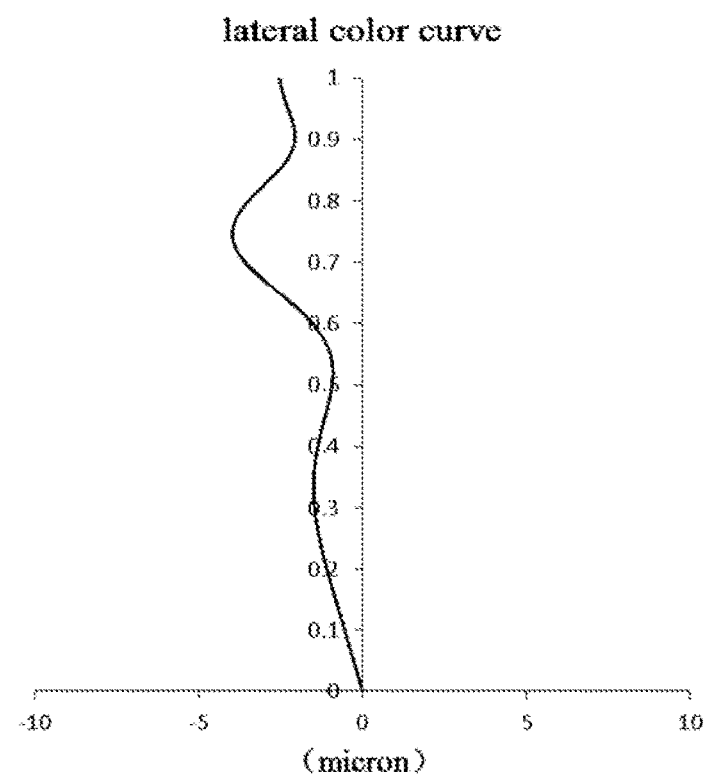

FIG. 8A shows a longitudinal aberration curve of the optical imaging lens assembly according to Embodiment 4 to represent deviation of a convergence focal point after light with different wavelengths passes through the lens. FIG. 8B shows an astigmatism curve of the optical imaging lens assembly according to Embodiment 4 to represent a curvature of tangential image surface and a curvature of sagittal image surface. FIG. 8C shows a distortion curve of the optical imaging lens assembly according to Embodiment 4 to represent distortion values corresponding to different fields of view. FIG. 8D shows a lateral color curve of the optical imaging lens assembly according to Embodiment 4 to represent deviation of different image heights on the imaging surface after the light passes through the lens. According to FIGS. 8A-8D, it can be seen that the optical imaging lens assembly provided in Embodiment 4 may achieve high imaging quality.

Embodiment 5

Figure 9:
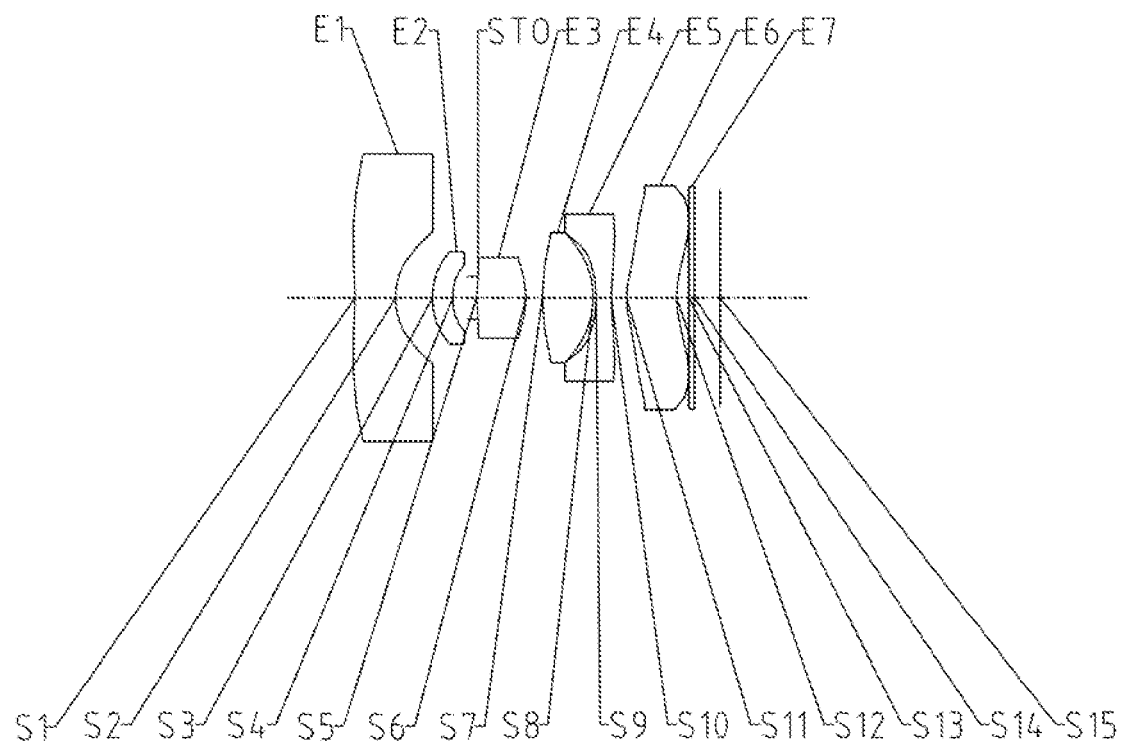
FIG. 9 shows a structural schematic diagram of an optical imaging lens assembly according to Embodiment 5 of the disclosure.

An optical imaging lens assembly according to Embodiment 5 of the disclosure is described below with reference to FIGS. 9-10D. FIG. 9 shows a structural schematic diagram of an optical imaging lens assembly according to Embodiment 5 of the disclosure.

As shown in FIG. 9, the optical imaging lens assembly sequentially includes from an object side to an image side: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 4.24 mm, a Total Track Length (TTL) of the optical imaging lens assembly is 19.64 mm, ImgH is a half of a diagonal length of an effective pixel region on the imaging surface S15 of the optical imaging lens assembly, and ImgH is 5.96 mm, Semi-FOV is a half of a maximum field of view of the optical imaging lens assembly, and Semi-FOV is 77.4°, and an Fno of the optical imaging lens assembly is 2.99.

Table 9 shows a basic parameter table of the optical imaging lens assembly of Embodiment 5, wherein the units of the curvature radius, the thickness/distance and the focal length are all millimeters (mm). Table 10 shows high-order coefficients applied to each of aspheric mirror surfaces in Embodiment 5. A surface type of each aspheric surface may be defined by formula (1) given in Embodiment 1.

TABLE 9

| Surface number | Surface type | Curvature radius | Thickness/ distance | Material | | Focal length | Conic coefficient |
|---|---|---|---|---|---|---|---|
| | | | | Refractive Index | Abbe number | | |
| OBJ | Spherical | Infinite | Infinite | | | | |
| S1 | Aspheric | −16.2950 | 2.1798 | 1.54 | 55.6 | −6.13 | −99.0000 |
| S2 | Aspheric | 4.3177 | 1.9880 | | | | −1.1623 |
| S3 | Aspheric | 4.9971 | 1.0920 | 1.65 | 23.5 | −4000.98 | 1.1923 |
| S4 | Aspheric | 4.5597 | 1.3715 | | | | 1.5475 |
| STO | Spherical | Infinite | −0.0852 | | | | 0.0000 |
| S5 | Aspheric | 8.5551 | 2.6574 | 1.55 | 56.1 | 6.56 | 9.7713 |
| S6 | Aspheric | −5.4983 | 0.8784 | | | | −1.7159 |
| S7 | Aspheric | 10.2144 | 2.7418 | 1.58 | 61.1 | 6.62 | −0.4628 |
| S8 | Aspheric | −5.7142 | 0.1536 | | | | −0.2337 |
| S9 | Aspheric | −7.6317 | 0.8000 | 1.67 | 20.3 | −7.37 | −3.7765 |

TABLE 9-continued

| Surface number | Surface type | Curvature radius | Thickness/ distance | Material Refractive Index | Abbe number | Focal length | Conic coefficient |
|---|---|---|---|---|---|---|---|
| S10 | Aspheric | 14.4958 | 0.8389 | | | | 7.7413 |
| S11 | Aspheric | 4.2955 | 2.6841 | 1.54 | 55.6 | 22.28 | −0.6444 |
| S12 | Aspheric | 5.2357 | 0.6710 | | | | −0.5571 |
| S13 | Spherical | Infinite | 0.3000 | 1.52 | 64.2 | | |
| S14 | Spherical | Infinite | 1.3700 | | | | |
| S15 | Spherical | Infinite | | | | | |

TABLE 10

| Surface number | A4 | A6 | A8 | A10 | A12 | A14 | A16 |
|---|---|---|---|---|---|---|---|
| S1 | 1.5574E−03 | −8.8113E−05 | 3.1324E−06 | −6.8182E−08 | 8.9365E−10 | −6.5157E−12 | 2.0322E−14 |
| S2 | 6.7920E−03 | −9.8959E−04 | 2.8064E−04 | −5.6756E−05 | 6.4112E−06 | −3.6310E−07 | 7.9071E−09 |
| S3 | 5.6770E−03 | 1.2126E−05 | 3.5324E−04 | −2.3332E−04 | 6.4570E−05 | −8.9495E−06 | 4.5736E−07 |
| S4 | 1.5809E−02 | 2.1213E−03 | 9.4017E−04 | −1.4197E−03 | 8.4181E−04 | −2.2513E−04 | 2.1806E−05 |
| S5 | 1.1007E−04 | 1.6933E−02 | −4.0154E−02 | 5.3487E−02 | −3.9543E−02 | 1.5168E−02 | −2.3459E−03 |
| S6 | −4.3795E−03 | 1.1356E−03 | 1.4930E−05 | −1.5204E−04 | 6.7403E−05 | −1.1572E−05 | 7.5241E−07 |
| S7 | −4.6497E−03 | 1.1123E−03 | −1.7802E−04 | 1.8526E−05 | −1.2292E−06 | 4.9647E−08 | −1.0041E−09 |
| S8 | −1.0755E−02 | 2.4668E−03 | −2.8489E−04 | 1.6847E−05 | −6.3743E−07 | 2.5926E−08 | −7.6492E−10 |
| S9 | −4.7673E−03 | 6.0862E−04 | −1.0282E−04 | 2.2972E−07 | 5.3412E−07 | −2.3589E−08 | 2.9492E−10 |
| S10 | −2.2103E−03 | 4.1614E−04 | −1.0104E−04 | 1.0553E−05 | −5.7521E−07 | 1.6189E−08 | −1.8751E−10 |
| S11 | −1.4220E−02 | 1.1562E−03 | −6.8399E−05 | 2.7882E−06 | −7.2638E−08 | 1.0529E−09 | −6.3664E−12 |
| S12 | −6.2637E−03 | 2.3216E−04 | −3.8384E−06 | −2.6852E−07 | 1.7155E−08 | −3.9148E−10 | 3.2518E−12 |

Figure 10A:
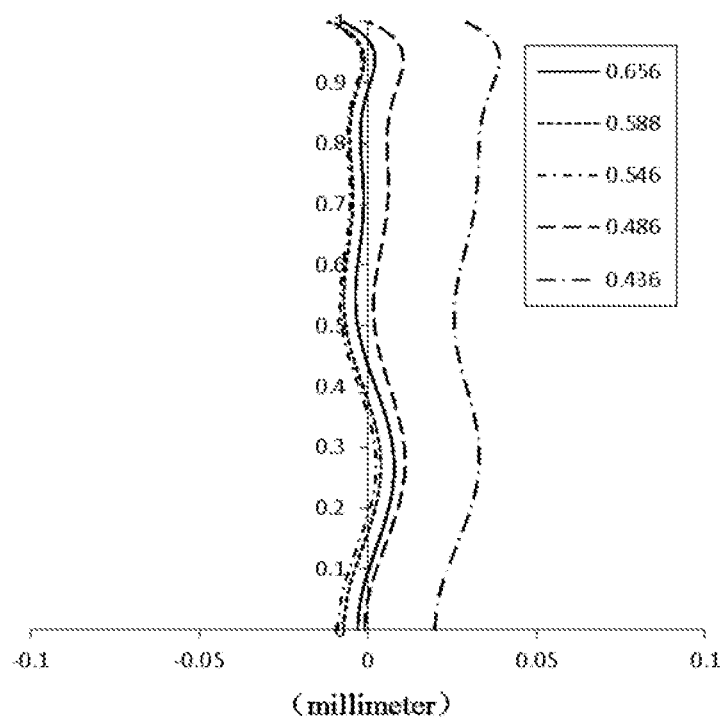
Figure 10B:
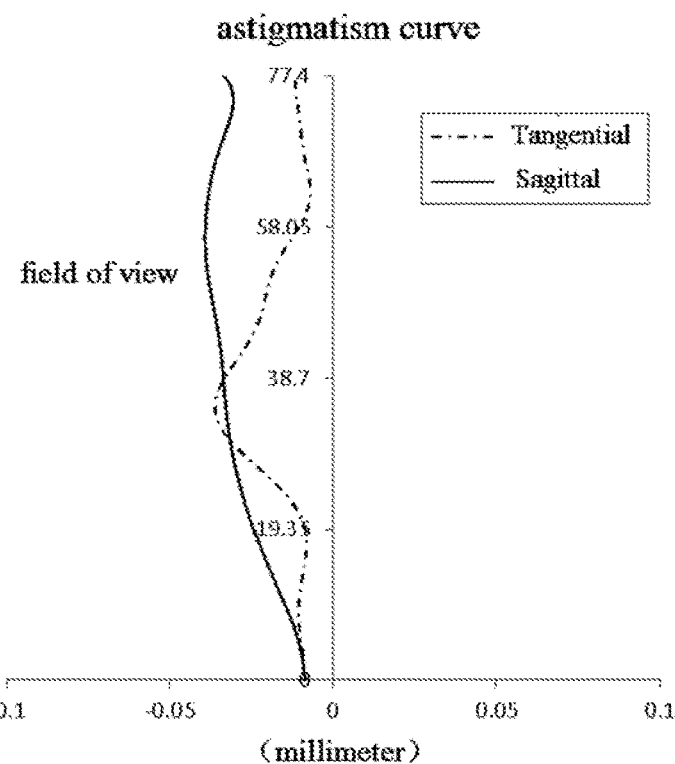
Figure 10C:
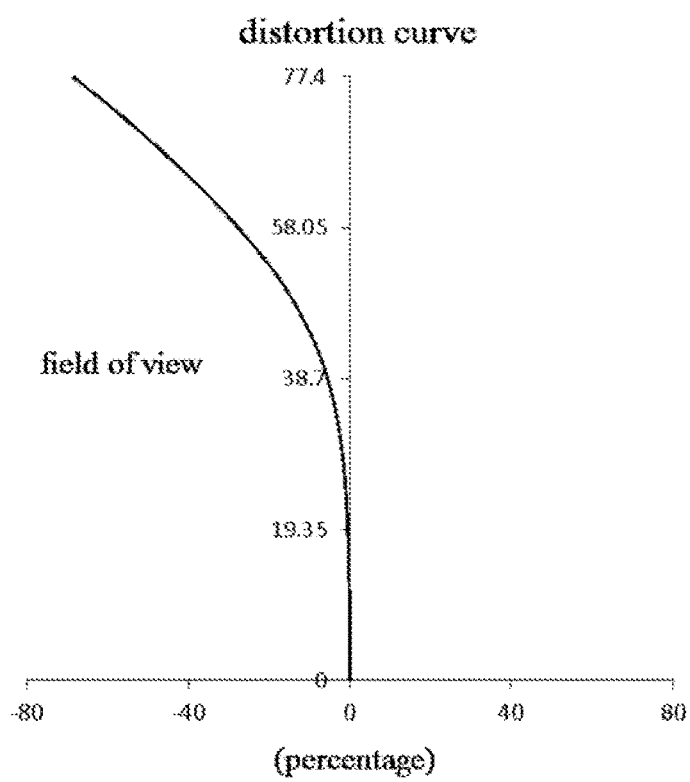

FIG. 10A shows a longitudinal aberration curve of the optical imaging lens assembly according to Embodiment 5 to represent deviation of a convergence focal point after light with different wavelengths passes through the lens. FIG. 10B shows an astigmatism curve of the optical imaging lens assembly according to Embodiment 5 to represent a curvature of tangential image surface and a curvature of sagittal image surface. FIG. 10C shows a distortion curve of the optical imaging lens assembly according to Embodiment 5 to represent distortion values corresponding to different fields of view. FIG. 10D shows a lateral color curve of the optical imaging lens assembly according to Embodiment 5 to represent deviation of different image heights on the imaging surface after the light passes through the lens. According to FIGS. 10A-10D, it can be seen that the optical imaging lens assembly provided in Embodiment 5 may achieve high imaging quality.

From the above, Embodiment 1 to Embodiment 5 satisfy a relationship shown in Table 11 respectively.

TABLE 11

| Conditional expression/Embodiment | 1 | 2 | 3 | 4 | 5 |
|---|---|---|---|---|---|
| |f5|/f4 | 1.10 | 0.83 | 1.40 | 1.28 | 1.11 |
| ImgH/f | 1.55 | 2.69 | 1.84 | 1.56 | 1.41 |
| CT6/T56 | 2.87 | 1.26 | 1.13 | 2.25 | 3.20 |
| CT3/T23 | 2.33 | 1.21 | 0.65 | 1.72 | 2.07 |
| R3/R2 | 1.11 | 1.45 | 1.65 | 1.09 | 1.16 |
| f5/f | −1.50 | −2.39 | −2.17 | −1.96 | −1.74 |
| f3/f1 | −1.41 | −1.31 | −1.36 | −1.41 | −1.07 |
| CT4/CT3 | 1.05 | 1.00 | 1.30 | 1.29 | 1.03 |
| R3/T12 | 2.79 | 1.43 | 1.05 | 1.17 | 2.51 |
| (R4 + R5)/(R4 − R5) | −2.43 | −3.02 | −4.32 | −2.44 | −3.28 |

TABLE 11-continued

| Conditional expression/Embodiment | 1 | 2 | 3 | 4 | 5 |
|---|---|---|---|---|---|
| R8/N4(mm) | −3.44 | −2.83 | −2.12 | −2.79 | −3.62 |
| V5/R9(mm-1) | −2.58 | −3.34 | −3.40 | −4.92 | −2.66 |
| T34/T45 | 6.22 | 9.44 | 4−21 | 15.43 | 5.72 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions provided in the disclosure.

What is claimed is:

1. An optical imaging lens assembly, sequentially comprising from an object side to an image side along an optical axis: a first lens, a second lens, a third lens, a fourth lens, a fifth lens, and a sixth lens with refractive power respectively, wherein a center thickness CT3 of the third lens on the optical axis and a center thickness CT4 of the fourth lens on the optical axis satisfy 1.0≤CT4/CT3<1.5; and a spacing distance T34 between the third lens and the fourth lens on the optical axis and a spacing distance T45 between the fourth lens and the fifth lens on the optical axis satisfy 4.0<T34/T45<15.5;

a curvature radius R2 of an image-side surface of the first lens and a curvature radius R3 of an object-side surface of the second lens satisfy 1.0<R3/R2<2.0.

2. The optical imaging lens assembly according to claim 1, wherein ImgH is a half of a diagonal length of an effective pixel region on an imaging surface of the optical imaging lens assembly, ImgH and a total effective focal length f of the optical imaging lens assembly satisfy 1.0<ImgH/f<3.0.

3. The optical imaging lens assembly according to claim 1, wherein a center thickness CT6 of the sixth lens on the optical axis and a spacing distance T56 between the fifth lens and the sixth lens on the optical axis satisfy 1.0<CT6/T56<3.5.

4. The optical imaging lens assembly according to claim 1, wherein the center thickness CT3 of the third lens on the optical axis and a spacing distance T23 between the second lens and the third lens on the optical axis satisfy 0<CT3/T23<2.5.

5. The optical imaging lens assembly according to claim 1, wherein an effective focal length f5 of the fifth lens and a total effective focal length f of the optical imaging lens assembly satisfy −2.5<f5/f≤−1.5.

6. The optical imaging lens assembly according to claim 1, wherein an effective focal length f1 of the first lens and an effective focal length f3 of the third lens satisfy −1.5<f3/f1<−1.0.

7. The optical imaging lens assembly according to claim 1, wherein a curvature radius R9 of an object-side surface of the fifth lens and an abbe number V5 of the fifth lens satisfy −5.0 mm-1<V5/R9<−2.5 mm-1.

8. The optical imaging lens assembly according to claim 1, wherein a curvature radius R3 of an object-side surface of the second lens and a spacing distance T12 between the first lens and the second lens on the optical axis satisfy 1.0<R3/T12<3.0.

9. The optical imaging lens assembly according to claim 1, wherein a curvature radius R4 of an image-side surface of the second lens and a curvature radius R5 of an object-side surface of the third lens satisfy −4.5<(R4+R5)/(R4−R5)<−2.5.

10. The optical imaging lens assembly according to claim 1, wherein a curvature radius R8 of an image-side surface of the fourth lens and a refractive index N4 of the fourth lens satisfy −4.0 mm<R8/N4<−2.0 mm.

11. The optical imaging lens assembly according to claim 1, wherein an effective focal length f4 of the fourth lens and an effective focal length f5 of the fifth lens satisfy 0.5<|f5|/f4<1.5.

12. The optical imaging lens assembly according to claim 1, wherein Semi-FOV is a half of a maximum field of view of the optical imaging lens assembly, and Semi-FOV satisfy Semi-FOV≥65°.

13. An optical imaging lens assembly, sequentially comprising from an object side to an image side along an optical axis: a first lens, a second lens, a third lens, a fourth lens, a fifth lens, and a sixth lens with refractive power respectively, wherein a curvature radius R9 of an object-side surface of the fifth lens and an abbe number V5 of the fifth lens satisfy −5.0 mm-1<V5/R9<−2.5 mm-1; and a spacing distance T34 between the third lens and the fourth lens on the optical axis and a spacing distance T45 between the fourth lens and the fifth lens on the optical axis satisfy 4.0<T34/T45<15.5;

a curvature radius R2 of an image-side surface of the first lens and a curvature radius R3 of an object-side surface of the second lens satisfy 1.0<R3/R2<2.0.

14. The optical imaging lens assembly according to claim 13, wherein a center thickness CT6 of the sixth lens on the optical axis and a spacing distance T56 between the fifth lens and the sixth lens on the optical axis satisfy 1.0<CT6/T56<3.5.

15. The optical imaging lens assembly according to claim 13, wherein a center thickness CT3 of the third lens on the optical axis and a spacing distance T23 between the second lens and the third lens on the optical axis satisfy 0<CT3/T23<2.5.

16. The optical imaging lens assembly according to claim 13, wherein an effective focal length f5 of the fifth lens and a total effective focal length f of the optical imaging lens assembly satisfy −2.5<f5/f≤−1.5.

17. The optical imaging lens assembly according to claim 13, wherein an effective focal length f1 of the first lens and an effective focal length f3 of the third lens satisfy −1.5<f3/f1<−1.0.

18. The optical imaging lens assembly according to claim 13, wherein ImgH is a half of a diagonal length of an effective pixel region on an imaging surface of the optical imaging lens assembly, ImgH and a total effective focal length f of the optical imaging lens assembly satisfy 1.0<ImgH/f<3.0.

* * * * *